(12) United States Patent
Gardner et al.

(10) Patent No.: US 8,905,828 B2
(45) Date of Patent: Dec. 9, 2014

(54) MEAT TENDERIZATION METHODS AND SYSTEMS

(75) Inventors: Matthew Gardner, Wichita, KS (US); Daniel L. Schaefer, Wichita, KS (US); James Claus, Verona, WI (US); David McKenna, Benton, KS (US)

(73) Assignee: Cargill, Incorporated, Wayzata, MN (US)

( * ) Notice: Subject to any disclaimer, the term of this patent is extended or adjusted under 35 U.S.C. 154(b) by 1324 days.

(21) Appl. No.: 11/556,879

(22) Filed: Nov. 6, 2006
(Under 37 CFR 1.47)

(65) Prior Publication Data
US 2007/0254579 A1    Nov. 1, 2007

Related U.S. Application Data (60) Provisional application No. 60/733,443, filed on Nov. 4, 2005, provisional application No. 60/777,616, filed on Feb. 28, 2006.

(51) Int. Cl.
*A22C 9/00*    (2006.01)

(52) U.S. Cl.
CPC ..................... *A22C 9/002* (2013.01)
USPC .......................................... 452/141

(58) Field of Classification Search
USPC ................. 452/141, 149, 160, 163–164
See application file for complete search history.

(56) References Cited

U.S. PATENT DOCUMENTS

| | | | |
|---|---|---|---|
| 3,579,716 A | | 5/1971 | Stouffer et al. |
| 3,657,770 A | * | 4/1972 | Wallace ........................ 452/52 |
| 4,221,021 A | | 9/1980 | Swilley |
| 4,838,036 A | * | 6/1989 | Norrie ............................. 62/63 |
| 4,985,963 A | * | 1/1991 | Norling ........................ 452/187 |
| 5,855,507 A | * | 1/1999 | Fisher et al. ................. 452/149 |
| 6,050,889 A | * | 4/2000 | Jacobs et al. ................. 452/160 |
| 6,106,384 A | * | 8/2000 | Mutoh et al. ................. 452/135 |
| 6,290,592 B1 | * | 9/2001 | Allen et al. .................... 452/58 |
| 6,364,759 B2 | * | 4/2002 | Allen et al. ................... 452/141 |
| 6,648,744 B2 | | 11/2003 | Bell et al. |
| 6,748,667 B2 | | 6/2004 | Sevastian |
| 2001/0034201 A1 | | 10/2001 | Bell et al. |
| 2005/0221746 A1 | | 10/2005 | Bell et al. |

FOREIGN PATENT DOCUMENTS

| | | |
|---|---|---|
| EP | 0 090 478 | 10/1983 |
| EP | 0 090478 | 10/1983 |
| WO | 95/31109 | 11/1995 |
| WO | WO 95/31109 | 11/1995 |
| WO | 00/65920 | 9/2000 |
| WO | WO 00/65920 | 11/2000 |

OTHER PUBLICATIONS

International Search Report, mailed Apr. 4, 2007, (3 pgs).
Sørheim, et al, "Muscle stretching techniques for improving meat tenderness," Trends in Food Science & Technology 13 (2002), pp. 127-135.

* cited by examiner

*Primary Examiner* — David Parsley (57) ABSTRACT

Methods and systems for extending or stretching muscles on an animal carcass by separating a hip joint of the carcass. Hip joint separation may be carried out while the carcass is suspended from a conveyor system as part of a commercial meat processing operation.

5 Claims, 6 Drawing Sheets

MEAT TENDERIZATION METHODS AND SYSTEMS

CROSS-REFERENCE TO RELATED APPLICATIONS

This application claims priority to U.S. provisional patent application 60/733,443 entitled "Meat Tenderization Methods and Systems" filed Nov. 4, 2005 and 60/777,616 entitled "Meat Tenderization" filed Feb. 28, 2006. Both of these applications are hereby incorporated by reference in their entirety.

FIELD OF THE INVENTION

This invention relates to methods for improving the tenderness of meat. More particularly, the invention relates to methods and apparatuses for improving meat tenderness through manipulation and/or electrical stimulation of an animal carcass optionally prior to rigor mortis.

BACKGROUND

A variety of approaches have been used to improve the tenderness of red meat products, several of which are reported in U.S. patent application Ser. No. 11/104,754, U.S. Pat. No. 6,648,744 and U.S. Pat. No. 6,748,667, each entitled "Method and Apparatus for Tenderizing Meat," and each of which is hereby incorporated by reference in its entirety. These references are collectively referred to herein as the "Bell patents."

One approach for tenderizing meat is to stretch, manipulate or otherwise affect muscles in a carcass prior to the onset of rigor mortis. Specific muscles stretching and/or manipulation techniques are reported in the Bell patents, as well as in Sorheim et al., "*Muscle Stretching Techniques For Improving Meat Tenderness*," Trends in Food Science and Technology, 13 (200) 127-135 (the "Sorheim" article).

In one embodiment, the Bell patent describes a method for tenderizing meat in which a carcass is halved and then one or more vertebrae of the carcass are separated to stretch certain muscles on the carcass. Electrical stimulation is then applied to portions of the carcass' musculature. The carcass is then stored in the chill room prior to being delivered to the cut floor.

An additional approach for tenderizing meat described in the Sorheim article is the "Tenderstretch" method. In the Tenderstretch method, the carcass is suspended from a physiological site in the pelvic region (as opposed to the more conventional Achilles suspension) for several hours while stored in the chill room. For example, the carcass is hung from the obturator foramen region of the carcass. The Sorheim article reports that the Tenderstretch method stretches certain muscles that are not stretched by Achilles suspension.

There is a need in the art for a meat tenderization method that incorporates aspects of the Tenderstretch method in a manner consistent with existing commercial meat production operations and commercial chain speeds.

BRIEF SUMMARY OF THE INVENTION

One embodiment of the present invention is a method for tenderizing meat in which at least one vertebra(e) of the carcass is separated, the carcass is hung by pelvic suspension and certain muscles of the carcass are subjected to electrical stimulation. The carcass is then suspended by an Achilles tendon prior to chilling the carcass.

In another embodiment, the present invention provides a system for processing a carcass in a meat plant. The system includes means for conveying a carcass through a processing facility, means for separating a vertebral column of the carcass, means for hanging the carcass at the pelvic region of the carcass, and means for electrically stimulating portions of the carcass.

One embodiment of the present invention provides a method for tenderizing meat in which the hip joint of a carcass is separated and a force is applied to the carcass to cause an extension of certain carcass muscles. In another embodiment, the hip joint is separated by destabilizing the hip joint and then applying a sufficient force of the hip joint to cause a separation between a femur bone and an acetabulum of the carcass.

In certain embodiments of the present invention, the hip joint of the carcass is separated before or while the carcass is suspended from a conveyor system as part of a commercial meat processing method. In other embodiments, a vertebral column of the carcass is also separated to extend the same or additional carcass muscles. In further embodiments, certain carcass muscles are subjected to electrical stimulation before, during and/or after separating the hip joint and/or vertebral column. Each of these steps may be performed during commercial beef processing and at commercial chain speeds.

The present invention also provides a system for processing a carcass in a meat plant. The system includes means for conveying a carcass through a processing facility, means for separating a hip joint of the carcass and means for applying a force to portions of the carcass. Embodiments of the invention may optionally include means for separating a vertebral column of the carcass, and means for electrically stimulating portions of the carcass.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the detailed description is to be regarded as illustrative in nature and not restrictive.

DETAILED DESCRIPTION

The present invention generally applies to the production of red meat slaughter animals (i.e., an animal that is slaughtered for red meat consumption), including without limitation all age and classes of bovine, porcine, and ovine animals.

Bovine animals include cattle, steers, heifers, cows, bulls, and also buffalo. Porcine animals include sows, gilts, barrows, boars, and feeder pigs. Ovine animals include sheep and lamb. The present invention may also apply to the production of tenderized meat from other animals as well, such as poultry or fish. Although portions of this application are directed toward the production of beef or beef carcasses, the invention is not necessarily limited to the production of beef products.

During commercial beef production, an animal is initially stunned and hung from a hook or hanger of a conveyor system, such as a trolley running along an overhead rail. The animal is then exsanguinated by severing the arteries at the base of the neck. The hide is then removed and the carcass is subjected to a prewashing operation prior to, during and/or after hide removal. The carcass's viscera are then removed and the carcass is split into two halves. Each half of the carcass is subjected to a steam pasteurization process to destroy microorganisms. The carcass is then sent to a chill room for approximately 24-48 hours prior to being transported to the cut floor. The present invention is directed to processing steps that are carried out after splitting the carcass, and up to and during the time the carcass resides in the chill room.

Figure 1:
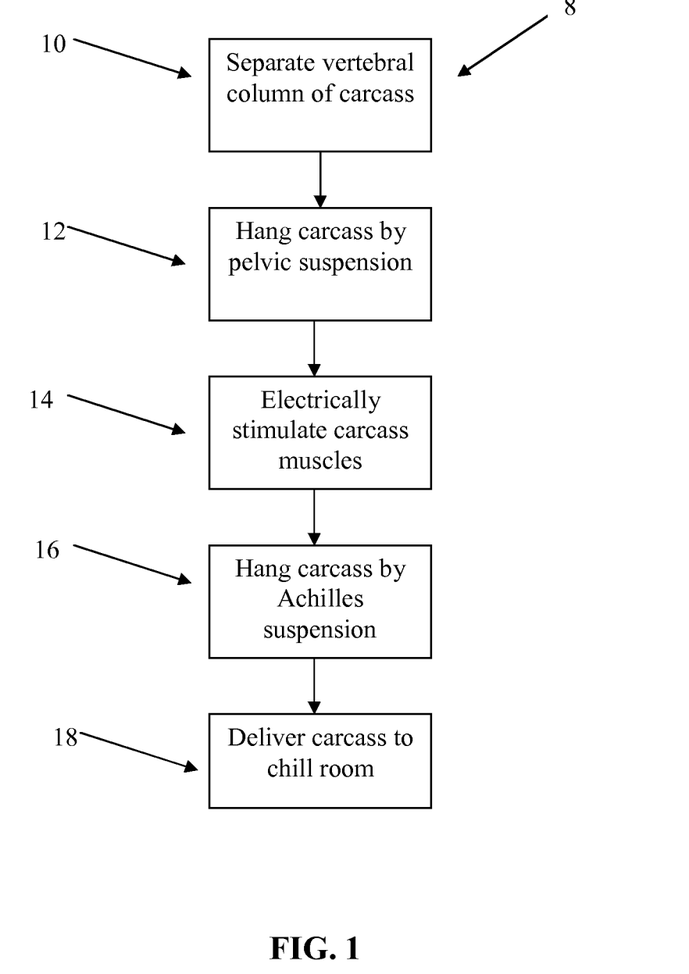
FIG. 1 is a flow-chart illustrating a commercial method for processing meat according to one embodiment of the present invention.

FIG. 1 is a flow-chart illustrating a method 8 of tenderizing meat during commercial beef production according to one embodiment of the present invention. In this embodiment, the vertebral column of the carcass is separated soon after the carcass is halved (as used herein "carcass" encompasses halved and whole carcasses) (Block 10). The carcass is then hung on the conveyor system by pelvic suspension (Block 12). Desired muscles of the carcass are subjected to electrical stimulation during pelvic suspension (Block 14). After electrical stimulation, the carcass is re-hung on the conveyor system by Achilles suspension (Block 16), prior to, during or after delivery to the chill room (Block 18).

Separating the Vertebral Column

To make separation of the vertebral column a viable commercial process for increasing the tenderness of meat, it is beneficial for the vertebral separation to be a quick operation so that the separation may be performed on carcasses at speeds that equal the chain speed of the processing line, referred to herein as "commercial chain speeds." For example, in commercial beef production, carcasses may move along a single chain or line at the rate of 150-600 head of cattle per hour, more particularly 200-400 head of cattle per hour, and even more particularly 250-350 head of cattle per hour.

Suitable methods for separating the vertebral column are described in detail in the Bell patent. A suitable method according to one embodiment of the present invention is summarized below.

Separation of the vertebral column may be performed anytime after the animal has been exsanguinated, but is generally carried out prior to the onset of rigor mortis. In one embodiment, the vertebral column is separated after the carcass has been halved, but before the carcass is delivered to the chill room. As used herein, "vertebral column" refers one or more sacral vertebra, lumbar vertebra, or thoracic vertebra.

The vertebral column may be separated by breaking, snapping, chopping, sawing, piercing, severing, parting, detaching, shearing, crushing or removing one more vertebra in the vertebral column. A separation may be performed at any point along the vertebral column of the carcass. For instance, for a beef carcass, any one of the first, second, third, fourth, or fifth sacral vertebra may be separated. Alternatively, a separation may be performed between any two sacral vertebrae (for example, between the third and fourth sacral vertebrae), or posterior to one of the first or fifth sacral vertebra. A separation may also be performed on any one of the first, second, third, fourth, fifth, or sixth lumbar vertebra. Alternatively, a separation may be performed between any two lumbar vertebrae (for example, between the fourth and fifth lumbar vertebrae) or posterior to one of the first or sixth lumbar vertebrae. A separation may also be performed on any one of the first, second, third, fourth, fifth, sixth, seventh, eighth, ninth, tenth, eleventh, twelfth, or thirteenth thoracic vertebra. Alternatively, a separation may be performed between any two thoracic vertebrae (for example, between the fifth and sixth thoracic vertebrae), or posterior to one of the first or thirteenth vertebra. It is to be understood, therefore, that a vertebra or vertebrae separation may be performed at any location on the spinal column.

The location of the separation may affect the extent to which particular muscles of the carcass are stretched during subsequent pelvic suspension. In one embodiment, separation is performed at or between the thoracic vertebra(e), more particularly, by making a cut at or between the twelfth and/or thirteenth thoracic vertebra(e) in order to maximize muscle stretching during the subsequent pelvic stretching reported below.

In one embodiment, the vertebral column of the carcass is separated during commercial meat production without disrupting the chain speed at which the carcasses move. For example carcasses may move along a single chain or line at the rate of 150-600 head of cattle per hour, more particularly 200-400 head of cattle per hour, and even more particularly 250-350 head of cattle per hour, during separation.

Hanging by Pelvic Suspension

In one embodiment, after separating the vertebral column and prior to delivery to the chill room, the carcass is hung on the conveyor system by pelvic suspension to stretch particular portions of the carcass as generally described by Sorheim et al. In one embodiment, the carcass is hung by and/or through the carcass's obturator foramen, eye of the aitch bone and/or the pelvic girdle. In an alternate embodiment, the carcass may be first hung by pelvic suspension and the vertebral column may then be separated.

Figure 2A:
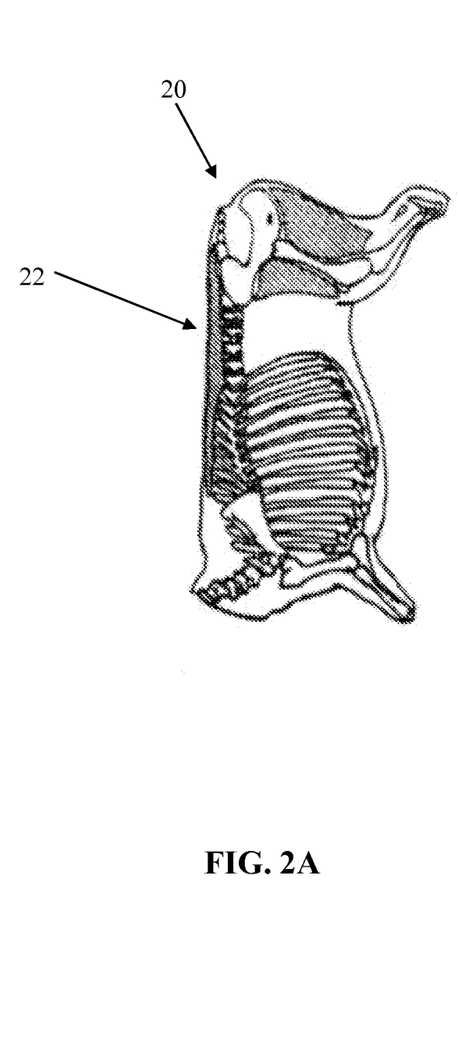
FIGS. 2A-2B are respective side views of a carcass hung by pelvic suspension and a carcass hung by Achilles suspension.
Figure 2B:
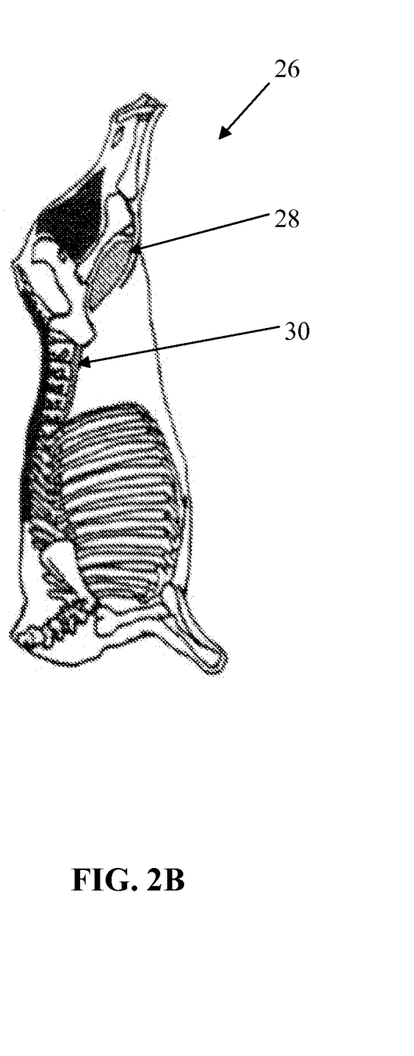

FIG. 2A shows an illustration of a carcass 20 hung by pelvic suspension. The cross-hatching represents muscle regions reportedly stretched by pelvic suspension. Notably, muscle region 22, which includes the longissimus muscles, is reportedly stretched by pelvic suspension. In contrast, FIG. 2B shows a carcass 26 hung by Achilles suspension including cross-hatched muscle regions 28 and 30 reportedly affected by Achilles suspension. The longissimus is reportedly not stretched during Achilles suspension.

In one embodiment, the carcass is hung at the pelvic site on a hook or similar device, which is generally connected to a conveyor system for transporting the animal through the slaughterhouse. Depending on the specific pelvic site used for pelvic suspension, the hook may pierce muscle, fat, cartilage or bone on the carcass in order to suitably support the carcass.

Depending on whether and/or how the carcass was suspended during vertebral column separation, the carcass may have to be transferred from Achilles suspension to pelvic suspension. In one embodiment, the carcass is hung by pelvic suspension using a technique that does not substantially affect commercial chain speed. For example, the carcass is manually transferred from Achilles suspension to pelvic suspension without reducing commercial chain speeds.

In one embodiment, pelvic suspension is utilized for a relatively short period of time prior to entering the chill room. For example, the carcass is hung by pelvic suspension for less than about 10 minutes, more particularly for less than about 5 minutes, and even more particularly for between about 30 seconds and 2 minutes. In this manner, benefits of pelvic suspension may be achieved without adversely affecting carcass spacing and/or floor space in the chill room. In other embodiments, pelvic suspension is utilized only during chilling, or both prior to and during chilling.

Electrical Stimulation

In one embodiment, portions of the carcass are electrically stimulated during pelvic suspension. For example, electrical stimulation is applied to select carcass muscles, particularly carcass muscles which have been or are being stretched by vertebral column separation and/or pelvic suspension. In another embodiment, electrical stimulation is carried out without affecting commercial chain speeds.

Figure 3:
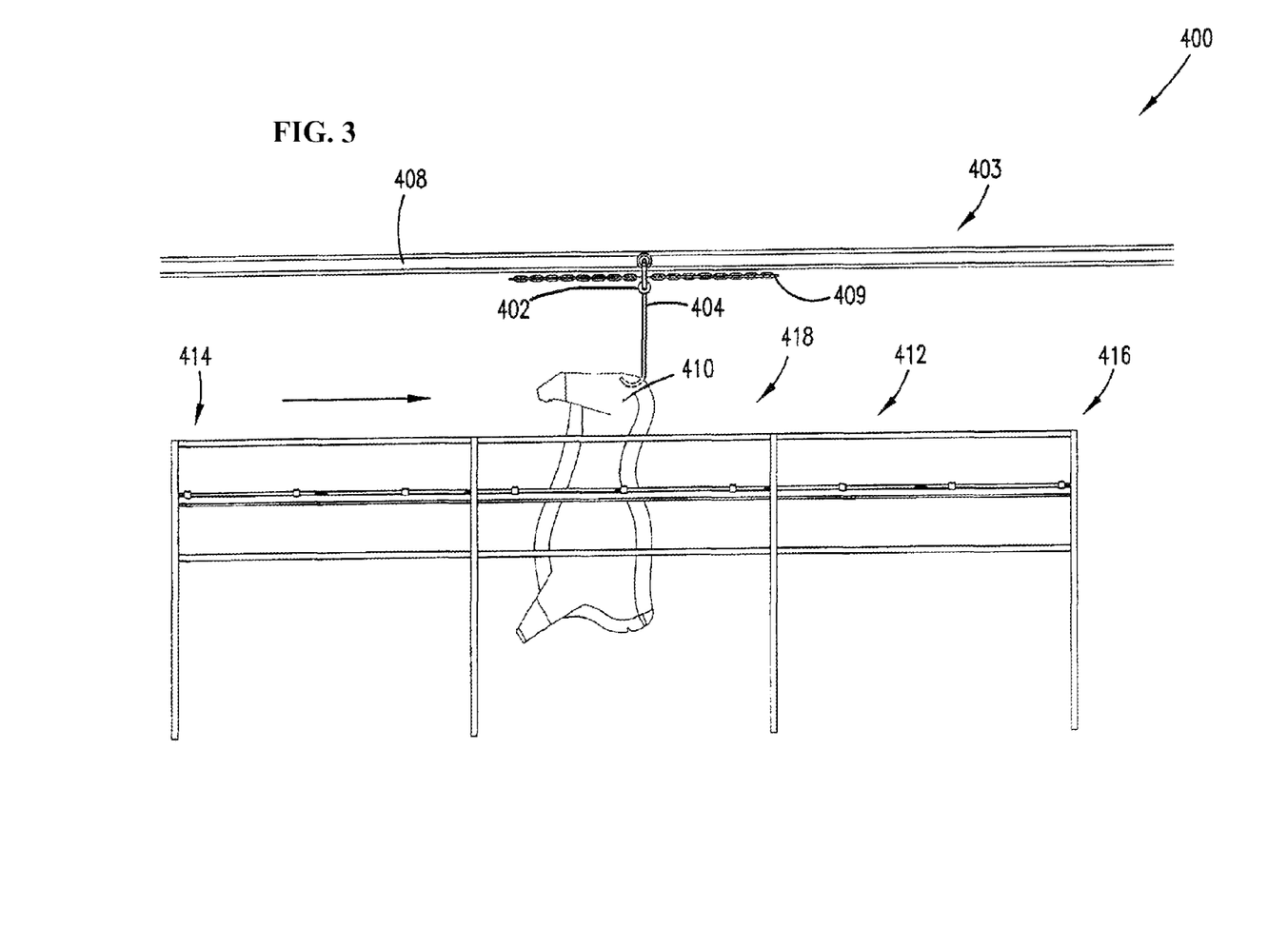
FIG. 3 is a side-view of an electrical stimulation apparatus according to one embodiment of the present invention.
Figure 4:
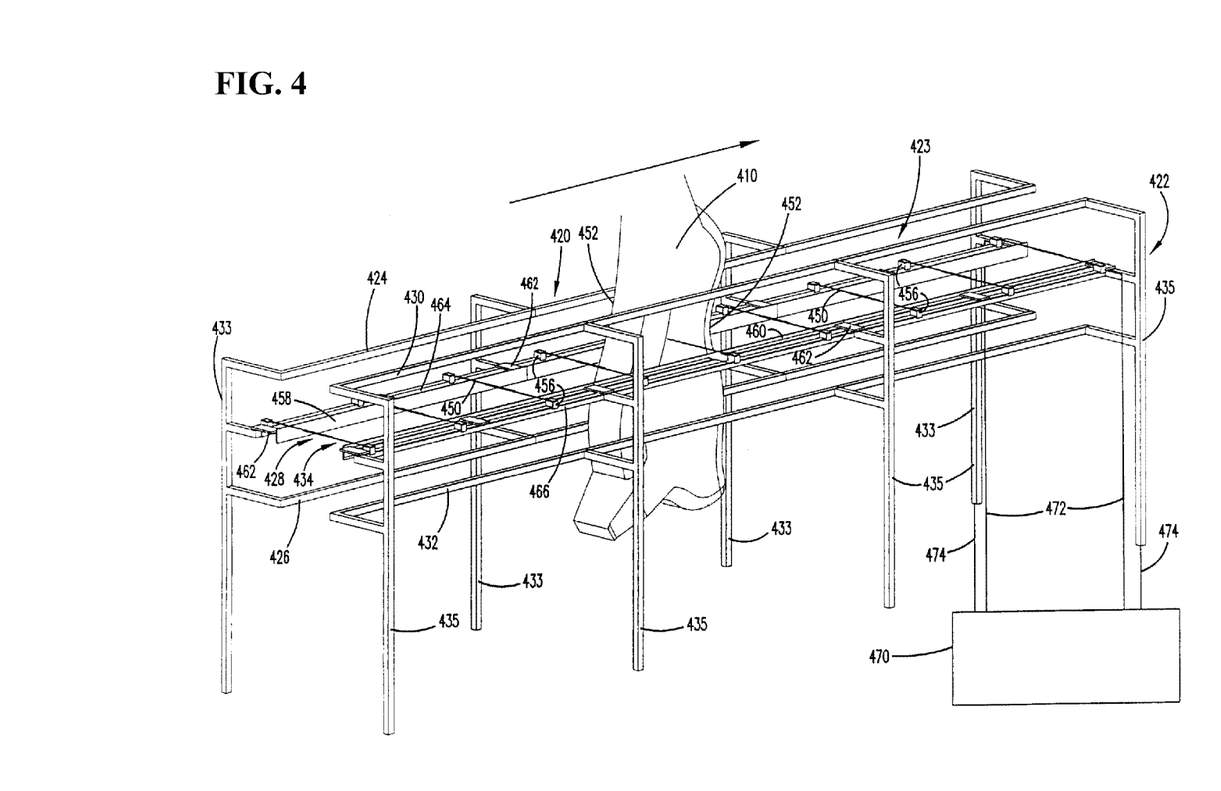
FIG. 4 is a perspective view of the apparatus illustrated in FIG. 3.

FIGS. 3 and 4 illustrate an electrical stimulation apparatus 400 suitable for use in the commercial beef production methods described herein. Additional procedures and systems are described U.S. Pat. No. 6,290,592 to Allen et al., which is hereby incorporated by reference in its entirety.

Figure 5:
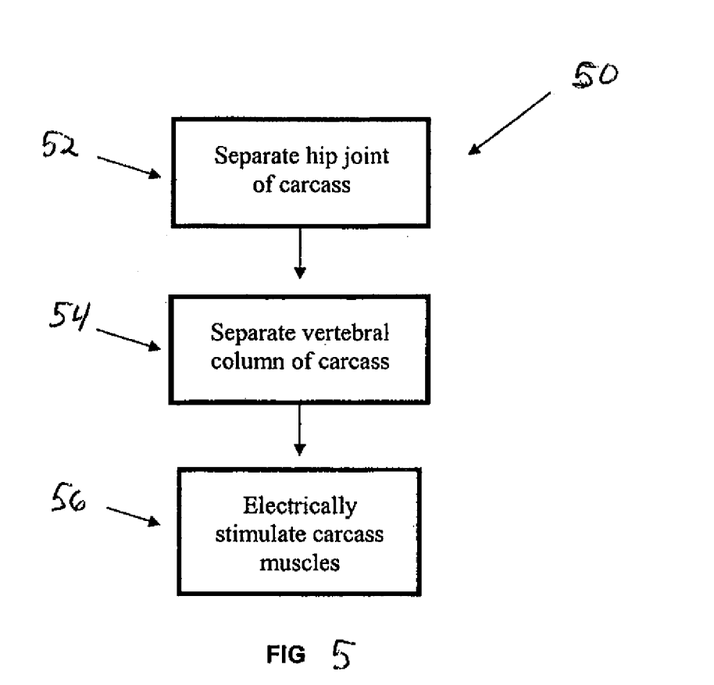
FIG. 5 is a flow-chart illustrating a commercial method for processing meat according to one embodiment of the present invention.

As shown in FIGS. 4 and 5, the animal carcass sides are hung from the posterior portion of the side from a hanger 402. The hanger 402 is in the form of a hook, and is considered part of a conveyor 403 that conveys an animal carcass (either whole or side) through animal processing operations. The hanger 402 extends from a trolley 406 that runs along a rail 408. The trolley 406 can be pulled along the rail 408 by a chain 409.

The electrical stimulation apparatus 400 provides targeted electrical stimulation to an animal carcass. The animal carcass 410 is shown as a right side carcass and moves through the electrical stimulation frame 412 in the direction of the arrow. Moving in the direction shown, the animal carcass 410 enters the electrical stimulation frame 412 at the inlet 414 and exits at the outlet 416. The electrical stimulation apparatus 400 can be constructed so that as the animal carcass 410 moves through the length 418 of the electrical stimulation frame 412 between the inlet 414 and the outlet 416, it receives the desired electrical stimulation protocol.

The electrical stimulation frame 412 includes a left side frame 420 and a right side frame 422. The electrical stimulation frame 412 may be provided with either the left side frame 420, the right side frame 422 or both. The animal carcass 410 moves from the inlet 414 to the outlet 416 along an animal carcass traveling path 423 provided between the left side frame 420 and the right side frame 422.

The left side frame 420 includes an upper ground 424, a lower ground 426, and a plurality of electrical stimulation probes 428 provided between the upper ground 424 and the lower ground 426. Similarly, the right side frame 422 includes an upper ground 430, a lower ground 432, and a plurality of electrical stimulation probes 434 provided between the upper ground 430 and the lower ground 432. The foregoing references to "upper" and "lower" refer to the respective location of the ground relative to the electrical stimulation probes.

That is, as the animal carcass is suspended from a hanger 402, the upper grounds 424 and 430 are closer to the hanger 402 than the plurality of electrical stimulation probes 428 and 434 and the lower grounds 426 and 432, Furthermore, although the upper ground 424 and the lower ground 426 are shown within a vertically extending plane, this condition is not necessary. That is, the upper grounds 424 and 430 and the lower grounds 426 and 432 are positioned to contact the animal carcass 410 as it moves along the animal carcass traveling path 423. In order to maintain contact with the carcass, the upper grounds, lower grounds and/or the electrical stimulation probes may be extended further towards the animal carcass traveling path. The upper grounds 424 and 430, lower grounds 426 and 432, and plurality of electrical stimulation probes 428 and 434 are supported by left and right frame constructions 433 and 435.

In a typical animal processing facility, an animal carcass is suspended from its posterior end so that its anterior end is closer to the ground. Accordingly, the position of each of the upper grounds 424 and 430, the lower grounds 426 and 432, and the plurality of electrical stimulation probes 428 and 434 can be arranged based upon the expected position of the muscle of an animal carcass passing along the animal carcass traveling path 423. For example, it is desirable for the electrical stimulation probes 428 and 434 to be placed so that they contact the animal carcass surface about centrally to the muscles targeted for electrical stimulation. In addition, it is generally desirable for the upper grounds 424 and 430 to contact the surface of the animal carcass at a location which allows for electrical stimulation in the midsection but minimizes electrical stimulation within the muscles in the posterior region. In general, this location can correspond to a location at about the border between the midsection and the posterior end section of the animal carcass.

Similarly, it is generally desirable for the lower grounds 426 and 432 to contact the animal carcass surface at a location that allows for electrical stimulation in the midsection but minimizes electrical stimulation within the muscles in the anterior region. In general, this location can correspond to a location at about the junction between the midsection and the anterior region of an animal carcass.

In one embodiment, the electrical stimulation probes contact the surface of the animal carcass at a location corresponding to the region of the fourth and fifth sacral vertebrae, the upper grounds 424 and 430 contact the surface of the animal carcass at a location corresponding to between about the eleventh thoracic vertebrae and the second lumbar vertebrae, and the lower grounds 426 and 432 contact the surface of the animal carcass at a location corresponding to about the fifth thoracic vertebrae and the sixth thoracic vertebra. In the situation where bovine carcasses are being processed, the vertical distance between the plurality of electrical stimulation probes and the upper ground is between about one foot and about two feet, and the distance between the plurality of electrical stimulation probes and the lower ground is between about one foot and about two feet.

To the extent that the electrical stimulation apparatus 400 is used to stimulate carcasses hung both by Achilles and pelvic suspension, there are several methods which may be used to account for the varying positions of the carcass. In one embodiment, the electrical stimulation apparatus is not reconfigured depending on the method of suspending the carcass. Instead, modifications are made to the conveyor system, and in particular to the height of the hook 404 relative to the apparatus. As shown in FIG. 4, for example, the hook 404 is attached to a hanger 402. The length of either the hanger 402, the hook 404 or a chain attached to the hook may be altered to depending on whether the carcass is hung by Achilles or pelvic suspension. Alternatively, the height of the grounds and/or probes may be modified depending on the method of suspension.

The electrical stimulation probes according to embodiments of the invention are used in combination with the ground to generate an electric current in targeted muscles. Accordingly, the electrical stimulation probes include a surface that contacts the animal carcass. In the case of electrical stimulation probes that are stakes, the stakes are embedded into the carcass (preferably muscle), and the electrical stimulation probes contact the surface of the carcass, but are not inserted into the muscle of the carcass.

When the electrical stimulation frame 412 includes both a left side frame 420 and a right side frame 422, a space 440 is provided between the frames, which is sized to receive the animal carcass 410 while allowing the upper grounds 424 and 430 and the lower grounds 426 and 432 to contact the animal carcass 410. When processing bovine carcasses, a distance between the upper grounds 424 and 430 of between about one foot and about five feet, and a distance between the lower grounds 426 and 432 of between about one foot and about five feet may be provided. More particularly, the distance between the upper grounds and the distance between the lower grounds is between about one and one-quarter feet and about two feet.

The plurality of electrical stimulation probes 428 and 434 extend away from the left side frame 420 and the right side frame 422, respectively, and extend into the animal carcass traveling path 423. As the animal carcass 410 moves through the animal carcass traveling path 423, the animal carcass 410 contacts each of the plurality of electrical stimulation probes 428 and 434. The contact time between the animal carcass 410 and each of the electrical stimulation probes varies depending upon the speed of the animal carcass 410 along the animal carcass traveling path 423, the length of each electrical stimulation probe, and the size of the animal carcass.

The plurality of electrical stimulation probes 428 includes electrical stimulation bars 450 which extend into the animal carcass traveling path 423. In one embodiment, the electrical stimulation bars 450 generally extend at an angle between about 50 degrees and about 130 degrees from an axis extending along the animal carcass traveling path 423 that is expected to be along the length of the electrical stimulation frame 412. In another embodiment, the electrical stimulation bars 450 extend perpendicularly to the line of travel through the animal carcass traveling path 423. As the animal carcass 410 moves along the animal carcass traveling path 442, each electrical stimulation bar or rod 450 sequentially contacts the exterior surface 452 of the animal carcass and maintains contact with the exterior surface 452 until the animal carcass 410 moves beyond the contact length 454 of the electrical stimulation probes 450. In certain embodiments, the electrical stimulation bars 450 bend, allowing the animal carcass 410 to move through the animal carcass traveling path 423. In other embodiments, the electrical stimulation bars 450 are mounted on a spring which allows the electrical stimulation bars 450 to remain relatively rigid while moving out of the way of the animal carcass and maintaining contact with the animal carcass surface 452.

In general, it is desirable to maximize the contact area between each electrical stimulation probe and the animal carcass. Depending upon whether the carcass moving along the animal carcass traveling path 423 is a left carcass side or a right carcass side, either the electrical stimulation probes 428 or the electrical stimulation probes 434 will maintain better contact. The plurality of electrical stimulation probes 428 maintains better electrical contact with the animal carcass 410 when the carcass is a left side carcass (dorsal side first). The plurality of electrical stimulation probes 434 maintains better electrical contact with the animal carcass when the carcass is a right side carcass (dorsal side first).

In one embodiment, the animal carcass 410 is moved through the electrical stimulation frame 412 dorsal side first from the inlet 414 to the outlet 416 to provide better contact between the plurality of electrical stimulation probes 428 and 434 and the animal carcass surface 452 closest to the muscles targeted for electrical stimulation.

The electrical stimulation probes 428 and 434 are held in place on the electrical stimulation frame 412 by receivers 456. The receivers 456 insulate the electrical stimulation probes 428 and 434 from the upper grounds 424 and 430 and the lower grounds 426 and 432. Furthermore, the electrical stimulation frame 412 includes insulating rails 458 and 460 that are held in place by rail holders 462 so that the animal carcass does not create a short circuit between the electrical stimulation probes 428 and 434 and the bars 464 and 466 along which the electrical stimulation probe holders 456 are placed.

A power source 470 is provided for providing electrical stimulation to the electrical stimulation probes 428 and 434 along line 472, and to the ground along line 474.

The upper grounds, lower grounds and probes are positioned to contact the suspended carcass at particular locations in order to apply high voltage electrical stimulation. In one embodiment, high voltage electrical stimulation is applied to the mid-section or "middle meats" of the carcass In another embodiment, electrical stimulation is applied to muscles in the vicinity of the ribs, loin, or round.

Hang Carcass by Achilles Suspension and Store in Chill Room

After applying electrical stimulation, the carcass is hung by Achilles suspension prior to, during or after delivery to the chill room without affecting commercial chain speeds. Because each carcass is hung by Achilles suspension (as opposed to pelvic suspension) during chilling, more carcasses can be stored in the chill room than if pelvic suspension is maintained.

Optional Additional Stretching of the Muscle Fibers

Additional muscle stretching techniques may be incorporated into the method reported herein. In one embodiment, for example, the carcass is moved or swung while suspended from the conveyor system before, during and/or after the stretching processes reported herein. In another embodiment, a stretching force such as a weight or a pulsing apparatus could also be attached to the carcass in order to increase the muscle stretch, particularly during pelvic suspension. Embodiments of the present invention could also be combined with feed supplements, chemical injections, breed and hump height programs, meat aging and/or other known methods for tenderizing meat.

Alternate Embodiments

The foregoing describes one embodiment for commercial beef production. However, several variations are possible according to alternate embodiments of the present invention.

In one alternate embodiment, for example, the carcass is hung by pelvic suspension prior to separating the vertebral column. In another alternate embodiment, the carcass is hung by Achilles suspension, the vertebral column is separated, and then the animal is hung by pelvic suspension.

In a further alternate embodiment, the carcass is hung by pelvic suspension prior to and/or after entering the chill room. For example, the carcass is hung by pelvic suspension prior to entering the chill room, and pelvic suspension is then maintained during chilling.

In yet another alternate embodiment, the carcass is electrically stimulated before, during and/or after pelvic suspension. In a further embodiment, the carcass is hung by pelvic suspension before and/or during storage in the chill room.

In yet a further embodiment, the methods and systems reported herein are integrated with methods of tenderizing meat by separating the hip joint of a carcass prior while the carcass is suspended. These methods and systems could be incorporated with the above described systems and methods to further stretch certain carcass muscles. For example, hip joint separation could be carried out prior to the steps set forth in FIG. 1. Alternatively, hip joint separation could be carried out prior to chilling the carcass.

FIG. 5 is a flow-chart illustrating a method 50 of tenderizing meat during commercial beef processing according to one embodiment of the present invention. After the carcass has been halved, and while suspended from the conveyor 50, the hip joint of the carcass is separated to extend certain carcass muscles (Block 52). Before, during or after hip separation, a vertebral column of the carcass is also separated (Block 54). Desired carcass muscles are also subjected to electrical stimulation (Block 56).

Separation of the Hip Joint

Figure 6A:
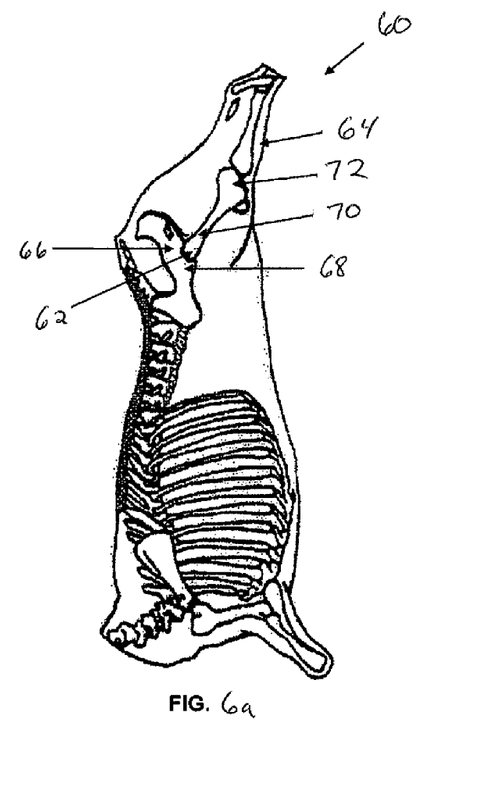
FIG. 6A is a sectional view of a bovine carcass skeleton.

FIG. 6A shows a side skeletal view of a bovine carcass 60 hung by its hind leg(s) (e.g., Achilles suspension) from a conveyor system (not shown) as part of a commercial meat processing operation. The hip joint 62 (i.e., the coxal joint) is the primary articulation point that connects the hindlimb 64 with the axial skeleton. The hip joint 62 is generally classified as a ball-and-socket joint. The hop joint 62 includes the pelvic bone 66 (scientifically referred to as the os coxae), which is comprised of the fusion of 3 bones—the ilium, ischium and pubis. The region where the ilium, ischium and pubis intersect is referred to as the acetabulum 68, which functions as the "socket" portion of the hip joint 62. The head 70 of the femur 72 is the bone structure that functions as the "ball" portion of the hip joint 62. The hip joint 62 is stabilized by ligaments and a fibrous layer of connective tissue called the joint capsule (not shown). The joint capsule bridges the head 70 of the femur 72 and the acetabulum 68 and is composed of an outer fibrous layer and synovial cells disposed inside of the fibrous layer.

Generally speaking, the hip joint 62 is separated by separating the head 70 of the femur bone 72 from the acetabulum 68. Separation can be accomplished in a variety of ways. In certain embodiments, for example, the hip joint 62 is first destabilized and a force is then applied to portions of the carcass to cause the head 70 of the femur 72 to separate from the acetabulum 68. The hip joint 62 may be destabilized by severing, breaking, snapping, chopping, sawing, piercing, parting, detaching, shearing, crushing or otherwise altering a sufficient amount of the connective tissue (e.g., ligaments, cartilage, muscle, and/or fat) surrounding and/or stabilizing the hip joint 62 to cause or induce a separation of the hip joint 62 upon the application of a suitable force. In one embodiment, the hip joint 62 is destabilized by severing the joint capsule with a sharp cutting instrument such as a knife.

Figure 6B:
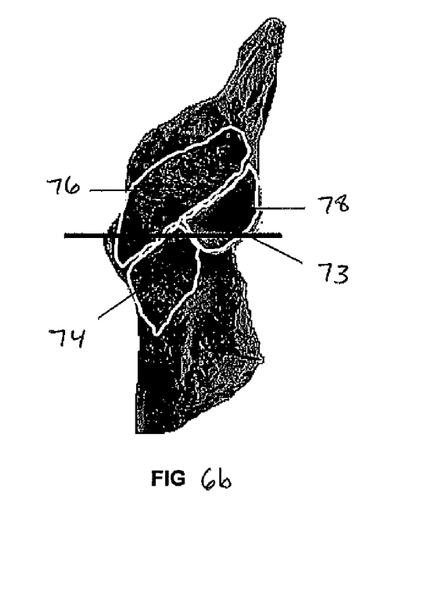
FIG. 6*b* is a side elevation view of certain bovine carcass muscles in the vicinity of the hip joint of a carcass.

FIG. 6B shows a side view of a portion of the musculature of a bovine carcass near the plane 73 at which the hip joint 62 is formed. Two of the major muscles that occupy this area of the carcass are the M. gluteus medius 74 (i.e., the major muscle of the top sirloin butt) and the M. biceps femoris 76 (i.e., the cap portion of the top sirloin butt). The "knuckle" muscle 78 (composed of the M. rectus femoris and the M. vastus lateralis) also occupies space in this area.

Separating the hip joint 62 causes certain carcass muscles, including the M. gluteus medius 74, the M. biceps femoris 76 and/or the knuckle muscle 78 to extend, stretch, elongate and/or relax (generally referred to herein as "extend" or "extension"). Muscle extension has been shown to provide increased tenderness under certain processing conditions.

The hip joint 62 is normally separated after the animal has been exsanguinated and prior to the onset of rigor mortis. In one embodiment, the hip joint 62 is separated after the carcass has been halved and prior to the carcass entering the chill room. In another embodiment, the hip joint 62 is separated after the carcass is halved while the carcass is suspended by its hind leg from the trolley. In this and other embodiments, the connective tissue surrounding the hip joint 62 may be severed using a sharp cutting instrument such as a knife, clipper, scissor, saw or any other device known to those skilled in the art. The hanging weight of the suspended carcass causes the hip joint 62 to separate once a sufficient amount of connective tissue has been severed to destabilize the hip joint 62. The foregoing approach may cause a separation of between about 1 to 2 inches between the acetabulum 68 and the femur head 70. The carcass may remain suspended in this manner until it is advanced to the cutting room floor.

In certain embodiments, additional force may be applied to the carcass by attaching weights to the forward-most extremities of the carcass (e.g., portions of the carcass furthest away from the point of suspension on the trolley), by swinging the carcass while suspended, or by applying any other force which would cause the desired separation.

In one embodiment, hip joint separation occurs without substantially interrupting commercial beef processing. For example, during commercial beef processing, carcasses may move along a single trolley conveyor chain or line at a rate of 150-600 head of cattle per hour, more particularly 200-400 head of cattle per hour, and even more particularly 250-350 head of cattle per hour. Thus, in one embodiment, hip joint separation occurs without substantially interrupting or slowing the selected commercial chain speed of the beef production operation.

The foregoing alternate embodiments may be utilized individually, collectively, and/or incorporated into the embodiments outlined in FIG. 1 to provide methods and systems for the commercial processing of meat, and in particular beef.

Example

Twenty randomly selected carcasses were halved. As the selected carcass sides exited the slaughter floor while suspended on an overhead trolley conveyor, the carcass sides were railed off and the hip joint was separated immediately by severing the connective tissue surrounding the hip joint with a sharp cutting instrument. For each carcass, one carcass side served as a control sample (i.e., no separation of the hip joint) and the corresponding carcass side served as the test sample (i.e., the hip joint was separated). The carcass side (i.e. left or right side) that served as the test sample was alternated between each carcass, such that the hip joint was separated on half of the right carcass sides and half of the left carcass sides.

The carcass halves were then chilled for 40 hours. After chilling, top sirloin butts from each carcass side were obtained. These top sirloin butts were then aged by vacuum sealing the sirloins and refrigerating for 14 days. The aged top sirloin butts were cut perpendicular to the muscle fiber orientation of the M. gluteus medius into 1-inch thick steaks. A total of 5 steaks were generated from each top sirloin butt. All accessory muscles, including the M. biceps femoris, were removed prior to cutting into the steaks. Steaks were cooked in an impingement cooker to an endpoint temperature of 70° C. and one slice was removed parallel to the muscle fiber orientation. Tenderness evaluations were conducted using the slice-shear-force (SSF) methodology. The SSF method is commonly employed for defining the tenderness of a cut of meat. A reduction in the shear force readings indicates tenderness. Slices were sheared using a Texture Analyzer obtained from Texture Technologies, Scarsdale, N.Y., and results were recorded as kg-of-force.

The results of the SSF tests showed that top sirloin steaks taken from the test samples had a numerically lower mean SSF value (20.8 Kg-F) than steaks taken from the control samples (21.6 kg-F).

We claim:

1. A method for processing an animal carcass for meat consumption comprising:
   a) providing a split carcass half having a hip joint having a joint capsule;
   b) causing a separation between a femur and an acetabulum of the split carcass half by first destabilizing the hip joint and then applying a force to the portions of the split carcass half to cause the head of the femur to separate from the acetabulum, wherein the split carcass half is substantially intact;
   c) suspending the split carcass half from a pelvic region of the carcass; and
   d) electrically stimulating the musculature of the split carcass half during pelvic suspension.

2. The method of claim 1 wherein the destabilizing step includes severing connective tissue in the vicinity of the hip joint.

3. The method of claim 1 further including the step of advancing the suspended carcass through a meat processing facility at commercial chain speeds, and wherein the separating step occurs at the commercial chain speeds.

4. The method of claim 1 further comprising the step of separating a vertebral column of the carcass.

5. The method of claim 1 wherein the destabilizing step includes severing the joint capsule with a sharp instrument.

* * * * *